United States Patent

Kosmalski

[11] Patent Number: 6,073,357
[45] Date of Patent: Jun. 13, 2000

[54] REMOTE PRECISION LAWN MOWER CUTTING HEIGHT GAGE

[76] Inventor: John Kosmalski, 7836 Bethel Church Rd., Saline, Mich. 48176

[21] Appl. No.: 08/940,389

[22] Filed: Sep. 29, 1997

Related U.S. Application Data

[60] Provisional application No. 60/027,575, Sep. 30, 1996.

[51] Int. Cl.[7] ........................................ G01B 5/25
[52] U.S. Cl. ........................ 33/628; 33/633; 33/833; 33/628
[58] Field of Search ............................ 33/628, 633, 634, 33/635, 640, 641, 832, 833, 792, 802, 836, 555, 556, 559

[56] References Cited

U.S. PATENT DOCUMENTS

| | | | |
|---|---|---|---|
| 1,129,705 | 2/1915 | Messier | 33/557 |
| 1,462,101 | 7/1923 | Colson | 33/833 |
| 2,089,124 | 7/1937 | Kleinmann | 33/555 |
| 2,474,482 | 1/1949 | Lovick | 33/555 |
| 3,664,029 | 5/1972 | Glucoft et al. | 33/180 R |
| 4,458,423 | 7/1984 | Sakata et al. | 33/832 |
| 4,594,785 | 6/1986 | Carlson | 33/172 R |
| 4,785,550 | 11/1988 | Wilkins | 33/833 |
| 5,031,335 | 7/1991 | Kimmelman | 33/628 |
| 5,175,939 | 1/1993 | Wolfram | 33/628 |
| 5,235,756 | 8/1993 | Wickenhaver | 33/832 |

OTHER PUBLICATIONS

ACCU–Gage, Catalog # 001, Precision Tool Products Co. Saline, Michigan, Jul. 9, 1987.

Paragauge, ACUSET Tool Co. Inc., Troy, Mi 48099, Sep. 20, 1990.

*Primary Examiner*—Diego Gutierrez
*Assistant Examiner*—Maria Fernandez
*Attorney, Agent, or Firm*—James M. Deimen

[57] ABSTRACT

A new cutting height gage for accurately setting the cutting height on greens mowers or other precision type mowers comprises a straight flat bar with a dial indicator at one end, a shouldered pin moveable perpendicular to the bar and a mechanism extending horizontally underneath the bar to transmit pin vertical movement to the dial indicator. When properly positioned the shouldered pin engages the cutter bar of the mower and the dial indicator is easily viewable from above the mower without significantly raising the mower or removing the cutting unit from the mower.

5 Claims, 3 Drawing Sheets

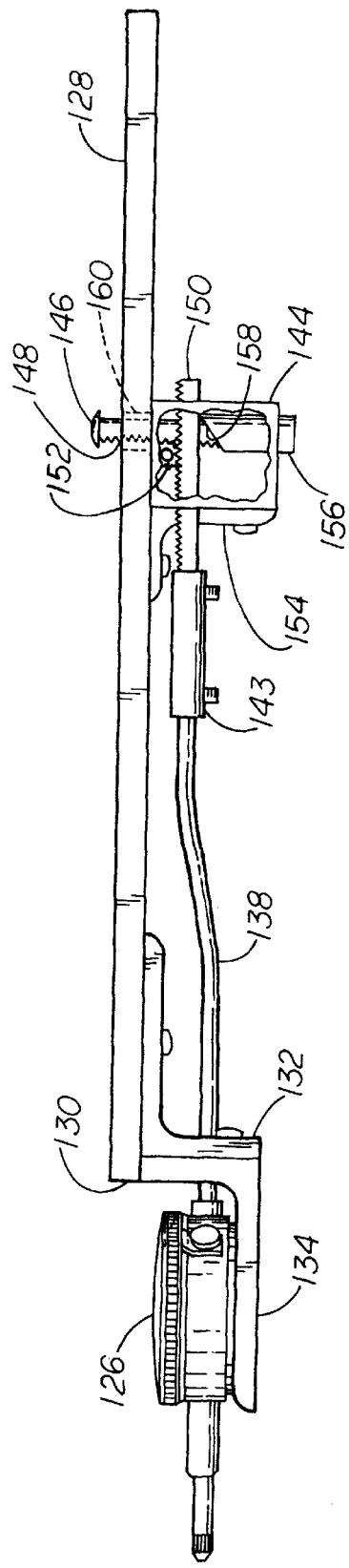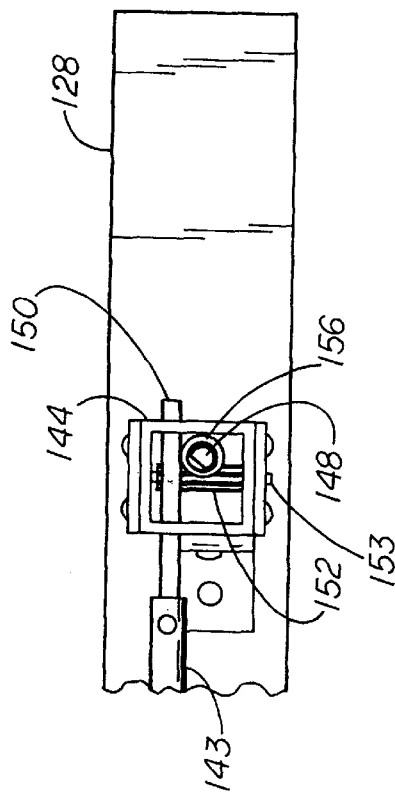

REMOTE PRECISION LAWN MOWER CUTTING HEIGHT GAGE

This application is a complete application based on provisional application Ser. No. 60/027,575, filed Sep. 30, 1996.

BACKGROUND OF THE INVENTION

The field of the invention pertains to precision mechanical gages and, in particular, to mechanical gages for setting the cutting height of golf course greens mowers. Such lawn mowers are constructed and adjusted for cutting a precise height of grass for a smooth even carpet-like green.

In recent years such mechanical gages have used dial indicators on a fixture that effectively provides a baseline for the measurement. U.S. Pat. No. 3,664,029 discloses a dial indicator mounted on a bar affixed to one shaft. The dial indicator contacts a second shaft to determine axial alignment. U.S. Pat. No. 4,594,785 discloses a dial indicator mounted on a flat plate for checking the piston travel in a disc brake caliper.

U.S. Pat. No. 5,031,335 discloses a greens mower height gage having a pair of dial indicators, one for the groomer and the other for the bed knife. The dial indicators are mounted on a flat bar that is positioned against the forward and rearward rollers of the mower. In use the dial indicators are visible only from under the mower. U.S. Pat. No. 5,175,939 also discloses a greens mower height gage but with a dial indicator extending from under the mower when the height gage is in use. The height gage is preset by adjusting a shoulder bolt that engages the bed knife. The front roller is vertically adjusted to substantially "zero out" a flexible bar which actuates the dial indicator. Thus, this gage takes measurements relative to a preset measurement or setting and is limited by the maximum deflection of the flexible bar. Only by removing the gage and changing the preset shoulder bolt can the measurement range be increased. Significant changes of cutting height and actual measurement of unknown cutting height are therefore awkward to make.

SUMMARY OF THE INVENTION

The new cutting height gage is a device for accurately setting the cutting height on greens mowers or other precision type mowers. The new gage can be used for both setting the height of cut from a previously known or unknown setting and for measuring the existing height of cut which may be unknown. The new gage can facilitate accurate settings to within the accuracy of the dial indicator, typically 0.001 inches.

Measuring or setting the height of cut is accomplished by first placing the flat rigid bar on both the rear and adjustable front rollers of the mower cutting units and simultaneously placing the shoulder of the indicating pin on the front edge of the cutter bar or bed knife. The indicating pin is connected to the dial indicator by a push/pull cable or wire. The dial indicator is located beyond the front end of the flat bar and thus enables a reading to be made from a remote location while the mower cutting unit remains connected to the mower. Thus, the new gage is particularly useful because height adjustments can be made without removing the mower cutting unit from the mower. In an alternative embodiment the push/pull wire is replaced by a double rack/single pinion mechanism and a rigid rod.

BRIEF DESCRIPTION OF THE DRAWINGS

FIG. 4 is a side view of an alternative form of the new remote precision gage; and FIG. 5 is a partial bottom view of the gage of FIG. 4.

DESCRIPTION OF THE PREFERRED EMBODIMENT

Figure 1:
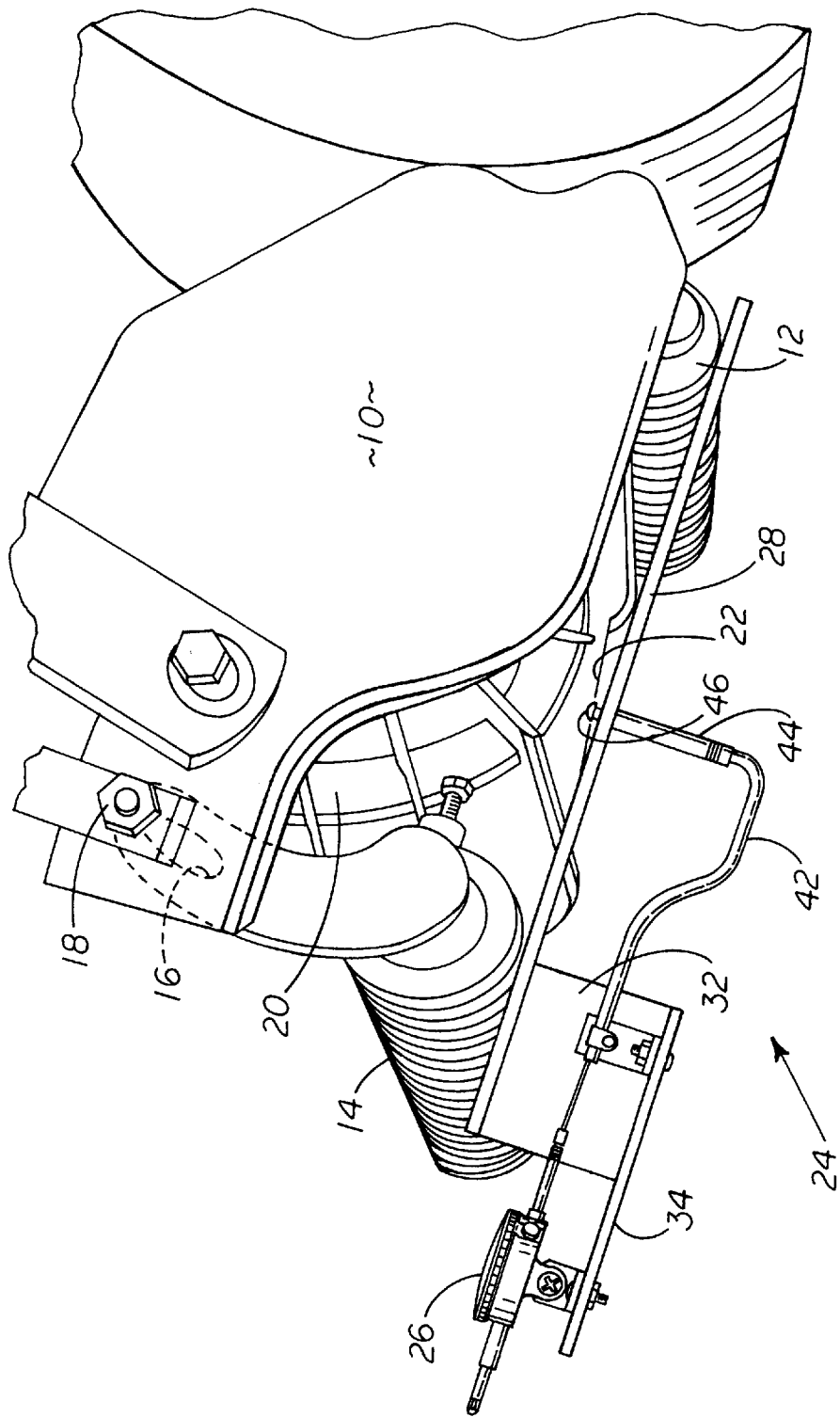
FIG. 1 is a cutaway perspective showing the new remote precision gage positioned under a mower.

Illustrated in FIG. 1 is a mower having a frame 10, a rear roller 12 and a front roller 14. The front roller 14 is adjustable vertically relative to the frame 10 by means of the slot 16 and bolt assembly 18. Between the rear roller 12 and front roller 14 is the rotatable blade assembly 20 and the cutter bar or bed knife 22.

By slightly raising the mower as shown the new remote precision gage generally denoted by 24 can be placed as shown against the rear roller 12 and front roller 14. Such placement permits a dial indicator 26 on the gage 24 to be viewable from above and in front of the mower.

Figure 2:
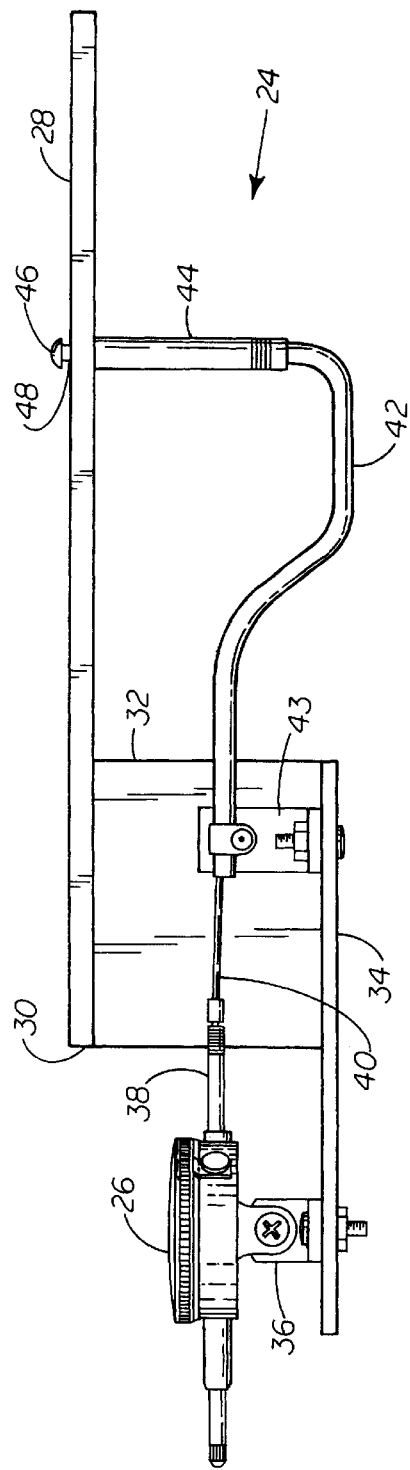
FIG. 2 is a side view of the new remote precision gage.
Figure 3:
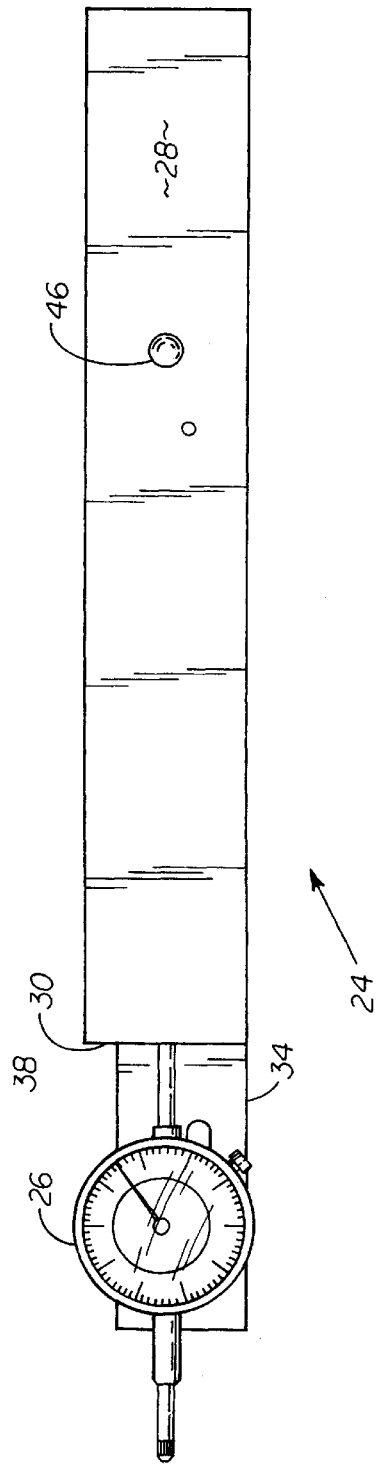
FIG. 3 is a top view of the new remote precision gage.

In FIGS. 2 and 3 the new gage 24 comprises a flat bar 28 of length adequate to extend between the rear 12 and front 14 rollers. Extending from the front 30 and below the flat bar 28 is a descending plate bracket 32 and second flat bar 34 to support the dial indicator 26 with bracket assembly 36.

The movable rod 38 of the dial indicator 26 is attached to a flexible wire 40 that, in turn, extends through a first tube 42 affixed by a bracket assembly at 43 and into a second large tube 44. The large tube 44 is fastened vertically to the underside of the flat bar 28. A headed pin 46 extends through a hole (not shown) in the flat bar 28 and down into the large tube 44 wherein the pin is fastened to the wire 40. The head of the pin 46 includes an underside shoulder 48 adapted to engage the cutter bar or bed knife 22 on the mower.

The new gage is used by placing the flat bar 28 as shown in FIG. 1 against the rear 12 and front 14 rollers and the shoulder 48 on the edge of the cutter bar or bed knife 22. Prior thereto the dial indicator 26 may be zeroed by having the shoulder 48 against the flat bar 20 and the bezel of the dial indicator rotated to zero at the dial indicator needle.

Once the new gage 24 is in the position shown in FIG. 1 it need not be removed until the measurement of cutting height is made or the front roller 14 adjusted to provide the desired cutting height. The full range of adjustment for the new gage or the full range of the slot 16, whichever is the lesser, is available without removing the new gage 24 from under the mower.

Illustrated in FIGS. 4 and 5 is an alternative form of the new cutting height gage. As above the dial indicator 126 is located beyond the front 130 of the flat bar 128. An angle bracket 132 fastened to the flat bar 128 supports a second angle bracket 134 which in turn supports the dial indicator 126. A longitudinally moveable rod 138 extends from the dial indicator 126 into a connector 143. The connector 143 is attached to a first rack 150.

The rack 150 is supported for longitudinal movement by a hollow box 144. The hollow box 144 is supported beneath the flat bar 128 by a bracket 154. Extending vertically within the hollow box 144 is a second rack 148 moveable vertically and supported by a tube 156. The tube 156 is press fit into a hole 160 in the flat bar 128 with the vertical second rack 148 extending through the flat bar 128 to the head and underside shoulder 146.

Mechanically connecting the first and second racks 150 and 148 for driving engagement is a pinion gear 152 mounted on a pinion shaft 153 in turn supported by the hollow box 144. The vertical tube 156 is cut-away at 158 to accommodate the engagement of the pinion gear 152 and vertical rack 148. Thus, vertical displacement of the head 146 causes horizontal movement of the rod 138 and a change in the dial indicator 126.

What is claimed is:

1. A lawn mower cutting height gage comprising a rigid bar engageable with the rollers of a lawn mower, a hole in the rigid bar, a moveable pin extending perpendicular to the rigid bar through the hole and having a shoulder on the pin adapted to engage a cutter bar on the lawn mower, means for vertical actuation on the pin, means for horizontal actuation extending beneath the rigid bar, said means for horizontal actuation in mechanical engagement with the means for vertical actuation, means to measurably indicate movement of the pin relative to the rigid bar when the pin moves, said means to measurably indicate movement affixed to the rigid bar at a location beyond the rollers of the mower when the gage is positioned on the mower and said means to measurably indicate movement operatively connected to the means for horizontal actuation.

2. The lawn mower cutting height gage of claim 1 wherein the means for vertical actuation and means for horizontal actuation each include racks and the mechanical engagement comprises a pinion gear interengaging the racks.

3. A lawn mower cutting height gage comprising a rigid bar engageable with the rollers of a lawn mower, a hole in the rigid bar, a moveable pin extending perpendicular to the rigid bar through the hole and having a shoulder on the pin adapted to engage a cutter bar on the lawn mower, means to measurably indicate movement of the pin relative to the rigid bar when the pin moves, said means to measurably indicate movement affixed to the rigid bar at a location beyond the rollers of the mower when the gage is positioned on the mower and said means to measurably indicate movement operatively connected to a means for horizontal actuation said means for horizontal actuation including means for flexible actuation extending horizontally beneath the rigid bar, said means for flexible actuation in mechanical communication with the moveable pin for vertical movement therewith.

4. The lawn mower cutting height gage of claim 3 including at least one tube extending beneath the straight bar and containing the means for flexible actuation.

5. The lawn mower cutting height gage of claim 4 wherein the means for flexible actuation comprises a wire and the means to measurably indicate movement comprises a dial indicator.

* * * * *